April 28, 1959   W. N. NELSON ET AL   2,883,978
BAKE AND BROIL UNIT

Filed May 19, 1954   2 Sheets-Sheet 1

INVENTORS.
Willis N. Nelson
Casimir J. Pavlak
BY

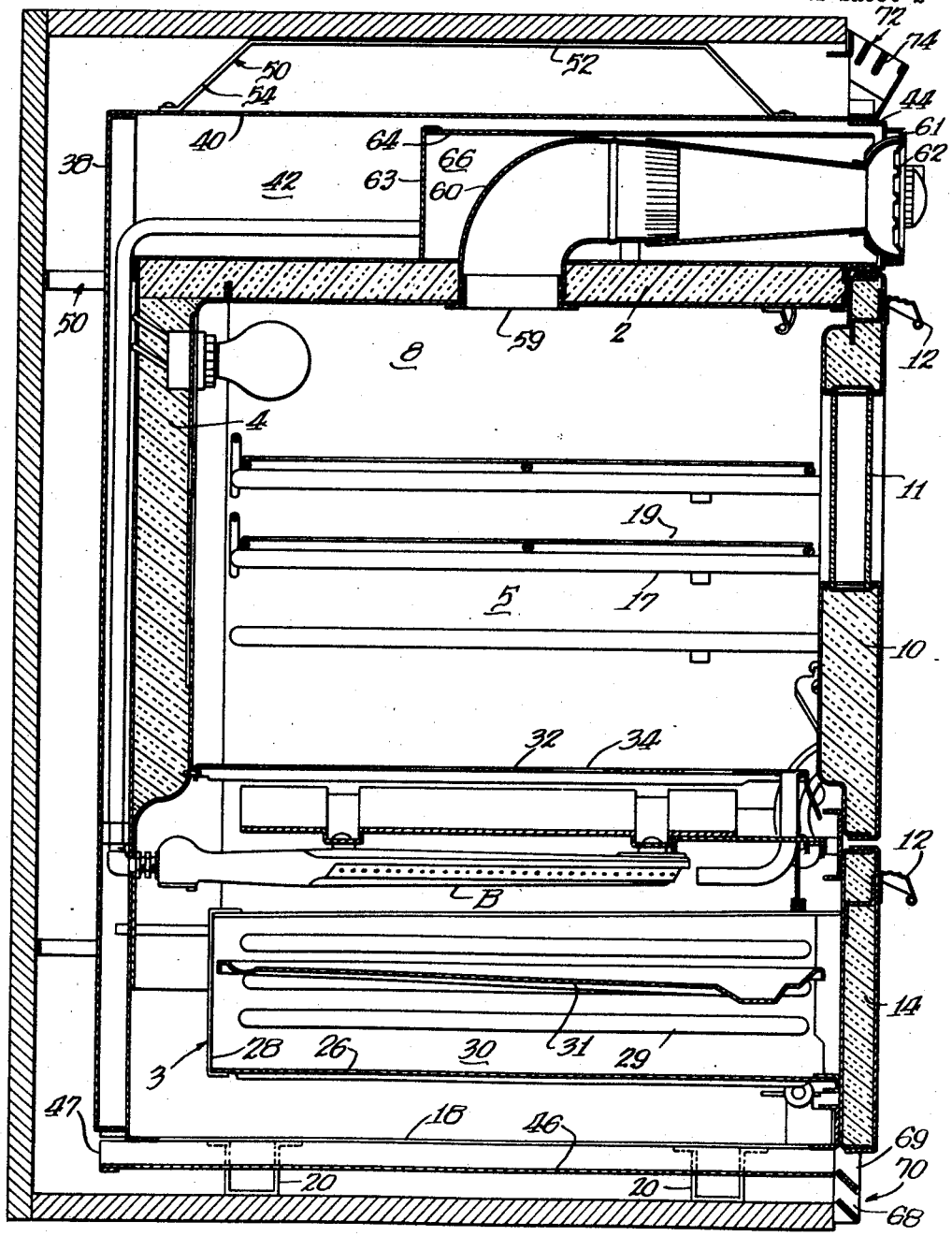

United States Patent Office 2,883,978
Patented Apr. 28, 1959

2,883,978

BAKE AND BROIL UNIT

Willis N. Nelson and Casimir J. Pavlak, Wisconsin Rapids, Wis., assignors to Preway, Inc., a corporation of Wisconsin Application May 19, 1954, Serial No. 430,772

3 Claims. (Cl. 126—39)

This invention relates to an oven unit and more particularly to an oven unit adapted to be built into a kitchen wall in the home or elsewhere.

It is a general object of the invention to provide an oven unit adapted to be mounted in a recess in a wall or cabinet in a manner to provide air spaces between the unit and the walls of the recess to insure adequate insulation and ventilation.

It is another object of the invention to provide an oven unit of the type described including a casing having means attached to the outside thereof to insure proper spacing of the unit to prevent overheating of the walls of a recess in which it may be mounted.

It is a further object to provide a bake and broil gas cooking unit comprising a cooking chamber having air passages therethrough to supply and exhaust combustion gases and having an insulating casing provided with spacing brackets attached to the outside thereof which facilitate insertion of the unit into a recess and maintain the casing properly spaced for insulation and air supply and exhaust.

Other objects and advantages will become apparent from the description of the drawings in which:

Fig. 3 is a section taken on the line 3—3 of Fig. 1.

Figure 1:
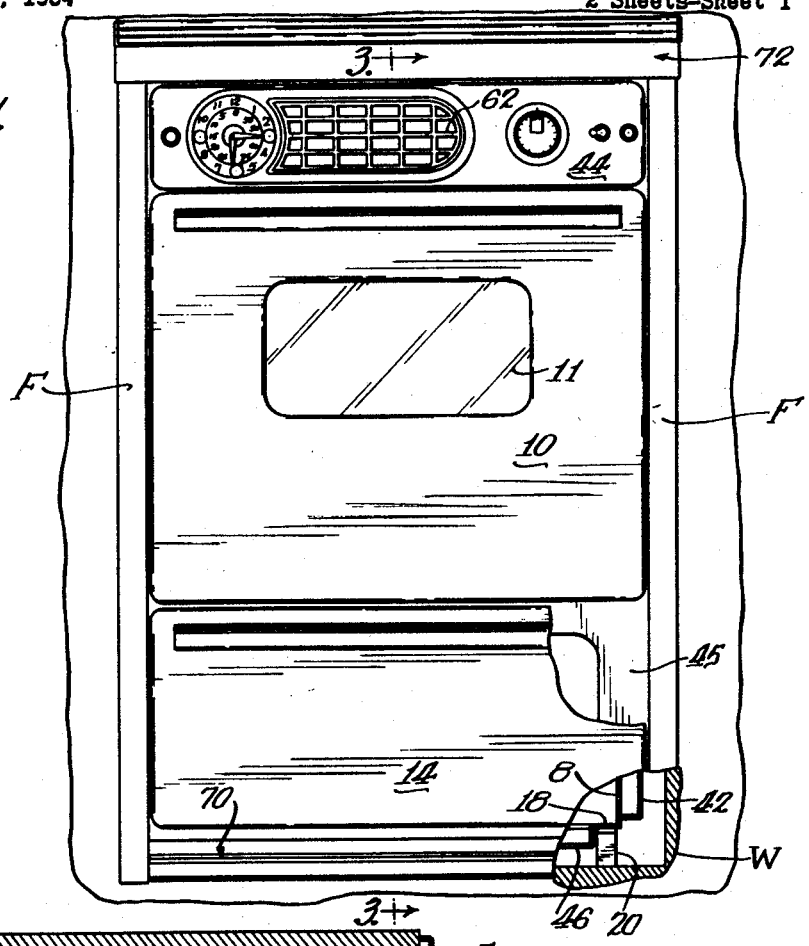
Fig. 1 is a front view of the oven unit shown as it appears when installed in a recess.

Referring now to the drawings and particularly Fig. 3, the oven unit is shown mounted in a recess in a cabinet, the walls of which are indicated at W. As illustrated herein, the unit includes a cooking chamber defined by a top wall 2, a rear wall 4, side walls 8 and front doors 10 and 14, all constructed of a suitable insulating material. The thick insulated construction of the rear wall 4 extends from the top down to the level of a centrally located burner B where it reduces to a thin wall construction. The side walls 8 are constructed in a similar manner and at the bottom thereof include inwardly turned flanges 18 extending toward the center of the unit to define a bottom for the cooking chamber having an opening of substantial proportions extending between the flanges and from front to rear to permit a free flow of air to the burner for combustion. U-shaped brackets 20 are secured to the underside of the flanges 18 to support the unit in a raised position.

The burner B serves a broil compartment 3 supported in the lower portion of the cooking chamber and a bake compartment 5 in the upper portion of the cooking chamber. The broil compartment 3 includes a bottom wall 26, a rear wall 28 and side walls 30 and is closed at the front by the lower front door 14. The side walls 30 are provided with inwardly pressed ridges 29 which support a shallow pan or tray 31 and the compartment is open at the top to expose food therein to the burner B. Air passing from the opening at the bottom of the chamber to the burner flows freely around the broil compartment.

The bake compartment is defined by the walls 2, 4 and 8 and the upper front door 10, previously referred to, and by a shelf 32 supported in the chamber above the burner and provided with openings 34 near the sides thereof to permit the flow of heated air from the burner into the compartment. The walls 8 carry guides 17 which support racks 19.

Each of the doors 10 and 14 is provided with a handle 12 and each is pivoted at the bottom thereof in a conventional manner to provide access to the bake and broil compartments, respectively. The upper door 10 is fitted with a double-walled glass window 11 to permit inspection of the bake compartment while the door is closed.

In order to insulate the cooking unit against heat loss and to prevent overheating of the walls of a recess in which the unit may be mounted, the invention embodies a casing which encloses the rear, top and side walls of the cooking chamber to provide a spaced, double-walled, insulated construction. This casing includes a rear wall 38, a top wall 40, side walls 42 and a short front panel 44 extending downwardly from the top casing wall 40 to the top chamber wall 2. The gap at the front between the side wall of the chamber and the side wall of the casing is closed by a cover 45 which forms a facing against which the front doors close. The casing is secured to the exterior of the cooking chamber in any suitable manner to insure that the walls of the casing are maintained in spaced relation to the walls of the cooking chamber.

Combustion gases are exhausted through the top wall 2 of the cooking chamber through an opening 59 therein and a flue 60 connected thereto. The flue 60 communicates with an opening 61 in the front panel 44 of the casing which is covered by a grill 62. The flue 60 is completely enclosed in a compartment in the casing, the compartment being formed by the top wall of the cooking chamber, a rear wall 63, top wall 64 and side walls 66. Each of the walls 63, 64 and 66 is spaced from the wall of the flue and from the casing walls to insure adequate insulation of the heated flue.

In order to space the casing from the walls of a recess in which it may be mounted and to insure ventilation of the space thus provided, spacing brackets 50 are attached to to each of the rear, top and side walls of the casing. Each of these brackets comprises a length of relatively rigid but resilient material, such as spring metal, having an intermediate portion 52 spaced from and parallel to the wall and end portions 54 attached to the wall. The brackets on the rear wall extend horizontally across the wall while the brackets on the top and side walls extend from front to back. In Fig. 3 it will be seen that the end portions 54 near the rear of the brackets on the top and side walls extend from the intermediate portion toward the wall and toward the rear to form an obtuse angle with the wall. This arrangement assists in guiding the unit on insertion into a recess while the parallel intermediate portions facilitate movement of the unit into its home position as well as maintain it in a properly spaced position.

Figure 2:
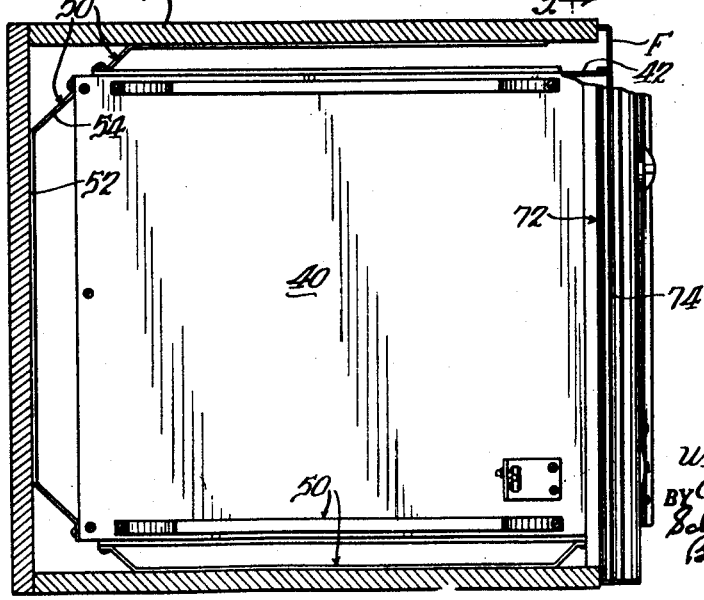
Fig. 2 is a top plan view showing the unit installed and the walls of the recess in section.

In order to close the gap at the front of the recess between the side walls of the casing and the side walls of the recess when the unit is mounted, a flange F extends outwardly from each of the side walls 42 of the casing substantially in the plane of the front doors of the cooking chamber. Each of these flanges extends from the side wall of the casing at least as far as the brackets on the corresponding wall extend so that the flange overlaps the wall of the recess as shown in Fig. 2. Air is admitted to the space between the casing and the recess walls through the openings in a louvered closure member 70 supported by and extending between the flanges F across the space between the bottom of the unit and the bottom wall of the recess.

A channel-shaped bottom panel 46 is supported in spaced underlying relation to the opening in the bottom of the cooking chamber to form a passage closed at the bottom and sides and open at the top, front and rear. Air entering through the bottom opening 68 of the louvered closure member 70 passes below the panel to the space afforded by the spacing brackets and air entering through the upper opening 69 in the louvered closure member 70 passes above the panel 46 to the cooking chamber. Any excess air entering above the panel 46 escapes at the open rear end 47 of the passage. A closure member 72 supported by and extending between the flanges F across the space between the top wall of the casing and the top wall of the recess is provided with an opening having upwardly directed air deflectors 74 to exhaust air from the space around the casing. Thus a flow of air about the casing is afforded when the unit is installed in a recess.

From the foregoing description it will be appreciated that when the unit is mounted in a recess, the walls of which are wood or some other inflammable material, the spaced, plural-walled, ventilated construction of the invention minimizes the danger from overheating and possible fire hazards attendant the use of inflammable materials.

We claim:

1. An oven unit adapted to be mounted in a recess in a wall or the like, said unit comprising: a cooking chamber defined by a top wall, side walls, a rear wall and front doors, a gas burner mounted centrally in said cooking chamber, the portions of each of said walls above the level of said burner and each of said doors being constructed of an insulating material and each of said side walls including an inwardly directed flange at the bottom thereof to define a bottom wall for said chamber having an opening of substantial proportions; a casing enclosing the walls of said cooking chamber at the rear, top and sides thereof to provide a spaced, double-walled, insulated construction including a rear wall a top wall and side walls, respectively, spaced from like walls of the cooking chamber and a front panel extending between the top casing wall and the top chamber wall; U-shaped brackets secured to the underside of each of the inwardly directed flanges at the bottom of the side walls of said cooking chamber to support the unit in a raised position; a channel-shaped panel underlying the opening in the bottom of said chamber and spaced therefrom to form a channel closed at the sides and open at the top, front and rear to admit air to said opening; spacing brackets attached to the outside of said casing walls to maintain the casing spaced from the walls of the recess when the unit is mounted; a flange at the front of each side wall of the casing extending outwardly therefrom substantially in the plane of the front doors on said cooking chamber; a louvered closure extending between said flanges at the bottom of said chamber to admit air below said channel-shaped panel to said recess and above said channel-shaped panel to said cooking chamber when the unit is mounted; upwardly directed air deflectors extending between said flanges at the top of said casing to exhaust air from said recess when the unit is mounted; a flue communicating with said cooking chamber and an opening in the front panel of said casing to exhaust combustion gases; and a compartment arranged on the top wall of the cooking chamber enclosing said flue in the space between the top of said chamber and the top of said casing.

2. An oven unit adapted to be mounted in a recess in a wall or the like, said unit comprising: a cooking chamber defined by a top wall, side walls, a rear wall and front doors, said chamber being open at the bottom; a gas burner mounted in said cooking chamber; a casing enclosing the walls of said cooking chamber at the rear, top and sides thereof to provide a spaced, doubled-walled, insulated construction including a rear wall, a top wall, and side walls, respectively, spaced from like walls of the cooking chamber and a front panel extending between the top casing wall and the top chamber wall; U-shaped brackets attached to the bottom of the side walls of said chamber to support the unit in a raised position; spacing brackets attached to the outside of said casing walls to maintain the casing spaced from the walls of the recess when the unit is mounted; a flange at the front of each side wall of the casing extending outwardly therefrom substantially in the plane of the front doors on said cooking chamber; a louvered closure extending between said flanges at the bottom of said chamber to admit air to said recess and to said cooking chamber when said unit is mounted; air deflectors extending between said flanges at the top of said casing to exhaust air from said recess when said unit is mounted; and a flue communicating with said cooking chamber and an opening in the front panel of said casing to exhaust combustion gases.

3. An oven unit adapted to be mounted in a kitchen wall or the like in a recess therein open at the front and having unit-surrounding top, bottom, side and rear walls, said unit comprising: a cooking chamber defined by a top wall, side walls, a rear wall, a front door, and a flange extending inwardly from each of said side walls at the bottom thereof to define a bottom wall for said chamber having a bottom opening; a casing enclosing the walls of said cooking chamber at the top, rear and sides thereof to provide a spaced, doubled-walled, insulated construction including a rear wall, a top wall, and side walls, respectively, spaced from like walls of the cooking chamber and a front panel extending between the top casing wall and the top chamber wall; a channel-shaped bottom panel extending in a front to rear direction in underlying spaced relationship to said bottom opening to form a channel closed at the sides and bottom and open at the top, front and rear to admit air to said bottom opening; support means secured to the bottom of the chamber side walls engageable with the bottom unit-surrounding wall to support the chamber and casing in a raised position in said recess with said bottom panel spaced above said bottom unit-surrounding wall; spacing means on the outside of said casing walls engageable with corresponding unit-surrounding walls to maintain the casing walls spaced from the corresponding unit-surrounding walls of the recess when the unit is mounted; a flange at the front of each casing side wall extending outwardly therefrom substantially in the plane of said front door for engaging the outer surface of said kitchen wall adjacent the recess when the unit is mounted; a closure member extending between said flanges at the bottom of said chamber providing an opening below said bottom panel to admit air below the panel to said recess and an opening above said bottom panel to admit air to said cooking chamber when the unit is mounted; a flue communicating with said cooking chamber and an opening in said front panel to exhaust gases from the cooking chamber; and a closure member extending between said flanges at the top of said front panel having an opening to exhaust air from said recess when the unit is mounted.

References Cited in the file of this patent

UNITED STATES PATENTS

| | | |
|---|---|---|
| 1,916,297 | Bright | July 4, 1933 |
| 1,962,222 | Weiler | June 12, 1934 |
| 2,376,571 | Brumbaugh | May 22, 1945 |
| 2,485,359 | Cook et al. | Oct. 18, 1949 |
| 2,512,521 | Davidson | June 20, 1950 |
| 2,632,435 | Lundstrum | Mar. 24, 1953 |
| 2,633,840 | Crawford | Apr. 11, 1953 |
| 2,739,583 | Hupp | Mar. 27, 1956 |
| 2,839,044 | Phares | June 17, 1958 |